United States Patent
Dinh et al.

(10) Patent No.: US 7,948,576 B2
(45) Date of Patent: May 24, 2011

(54) P-CHASSIS ARRANGEMENT FOR POSITIONING A DISPLAY STACK

(75) Inventors: Richard Hung Minh Dinh, Cupertino, CA (US); Wei Yao, Fremont, CA (US); Erik Wang, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 291 days.

(21) Appl. No.: 12/238,316

(22) Filed: Sep. 25, 2008

(65) Prior Publication Data
US 2010/0073859 A1    Mar. 25, 2010

(51) Int. Cl.
G02F 1/1333    (2006.01)
G02F 1/13    (2006.01)
H05K 7/04    (2006.01)

(52) U.S. Cl. .................. 349/58; 349/187; 361/679.28

(58) Field of Classification Search ............. 349/58–60, 349/187; 361/679.21–679.3
See application file for complete search history.

(56) References Cited

U.S. PATENT DOCUMENTS

| | | | |
|---|---|---|---|
| 4,579,380 A * | 4/1986 | Zaremsky et al. | 294/119.1 |
| 4,997,224 A * | 3/1991 | Pierce | 294/16 |
| 5,675,396 A * | 10/1997 | Tsunehiro | 349/59 |
| 6,034,751 A * | 3/2000 | Kamiya | 349/60 |
| 6,474,712 B1 * | 11/2002 | Govzman et al. | 294/106 |
| 6,494,429 B2 * | 12/2002 | Tajima | 248/473 |
| 6,547,296 B1 * | 4/2003 | Perkitny et al. | 294/16 |
| 6,909,475 B2 * | 6/2005 | Kojima et al. | 349/58 |
| 6,932,557 B2 * | 8/2005 | Downs et al. | 414/741 |
| 7,300,084 B2 * | 11/2007 | Chae et al. | 294/119.1 |
| 7,422,411 B2 * | 9/2008 | Downs et al. | 414/741 |
| 7,423,704 B2 * | 9/2008 | Cho et al. | 349/58 |
| 7,562,923 B2 * | 7/2009 | Han et al. | 294/119.1 |
| 7,616,289 B2 * | 11/2009 | Chae et al. | 349/187 |
| 7,626,654 B2 * | 12/2009 | Tsubokura et al. | 349/60 |
| 7,670,555 B2 * | 3/2010 | Hoover et al. | 422/65 |
| 7,768,605 B2 | 8/2010 | Polak | |
| 7,779,366 B2 | 8/2010 | Bells et al. | |
| 7,826,206 B2 * | 11/2010 | Woo | 361/679.05 |
| 2003/0178866 A1 * | 9/2003 | Chae et al. | 294/119.1 |
| 2007/0023397 A1 * | 2/2007 | Hohne et al. | 217/36 |

* cited by examiner

Primary Examiner — Michelle R Connelly Cushwa

(57) ABSTRACT

Methods and apparatus for aligning a display stack with respect to a housing associated with a portable electronic device are disclosed. According to one aspect of the present invention, a chassis arrangement suitable for use in aligning a display stack with respect to a housing includes a first portion, a second portion, and a coupling arrangement. The first portion is configured to engage the display stack, and the second portion is configured to enable the display stack to be manipulated when the display stack is engaged by the first portion. The coupling arrangement couples the first portion with the second portion, and is configured to enable the second portion to be detached from the first portion.

10 Claims, 7 Drawing Sheets

P-CHASSIS ARRANGEMENT FOR POSITIONING A DISPLAY STACK

BACKGROUND OF THE INVENTION

1. Field of the Invention

The present invention relates to portable electronic devices and, more particularly, to a chassis which may be used to align a display stack with respect to a bezel.

2. Description of the Related Art

Many portable electronic devices include displays which are supported by a bezel or, more generally, a housing. Such devices may include, but are not limited to including, cellular phones, portable media players, and personal digital assistants. The alignment of display stacks with respect to a housing is generally a delicate procedure, as the display stacks are delicate to handle, and the available space between the edges of a display stack and side surfaces of the housing is relatively minimal.

Increasing the size of the gaps between the edges of a display stack and the surfaces of a housing may facilitate the alignment of the display stack with respect to the housing. However, increasing the size of the gaps is not always possible, as there may be overall size requirements for the devices of which the display stack and the housing are a part.

Therefore, what is needed is a method and an apparatus which allows a display stack to be efficiently aligned with respect to a housing. More specifically, what is desired is a method and an apparatus which allows a display stack to be accurately aligned with respect to a housing without damaging the display stack or increasing the size of gaps between edges of the display stack and edges of the housing.

SUMMARY OF THE INVENTION

The present invention pertains to chassis with a breakaway hinge that is suitable for aligning a display stack with respect to a housing or an enclosure such as a bezel. The present invention may be implemented in numerous ways, including, but not limited to, as a method, system, device, or apparatus (including computer program code). Example embodiments of the present invention are discussed below.

According to one aspect of the present invention, a chassis arrangement suitable for use in aligning a display stack with respect to a housing includes a first portion, a second portion, and a coupling arrangement. The first portion is configured to engage the display stack, and the second portion is configured to enable the display stack to be manipulated when the display stack is engaged by the first portion. The coupling arrangement couples the first portion with the second portion, and is configured to enable the second portion to be detached from the first portion.

According to another aspect of the present invention, an assembly for use as a part of an electronic device includes an enclosure which has at least a first side, and a display stack which has at least a first edge. The display stack is positioned at least partially within the enclosure with the first edge being separated from the first side by a first distance. The assembly also includes a chassis component positioned between the first side and the first edge. In one embodiment, the first distance is in the range of between approximately 0.2 millimeters (mil) and approximately 0.7 mil.

In accordance with another aspect of the present invention, a method for aligning a display stack with respect to an enclosure includes positioning the display stack in a chassis arrangement. The chassis arrangement includes a first portion arranged to grasp the display stack and a second portion arranged to manipulate the display stack when the display stack is grasped by the first portion. The first portion and the second portion are coupled. The method also includes orienting the display stack at least partially within the enclosure. Orienting the display stack at least partially within the enclosure includes positioning the display stack at a desired location within the enclosure. Finally, the method includes detaching the second portion from the first portion. When the second portion is detached from the first portion, the first portion to remains in contact with the display stack. In one embodiment, the second portion and the first portion are coupled by at least one living hinge which is broken to detach the second portion from the first portion.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, in which.

DETAILED DESCRIPTION OF THE INVENTION

Figure 1:
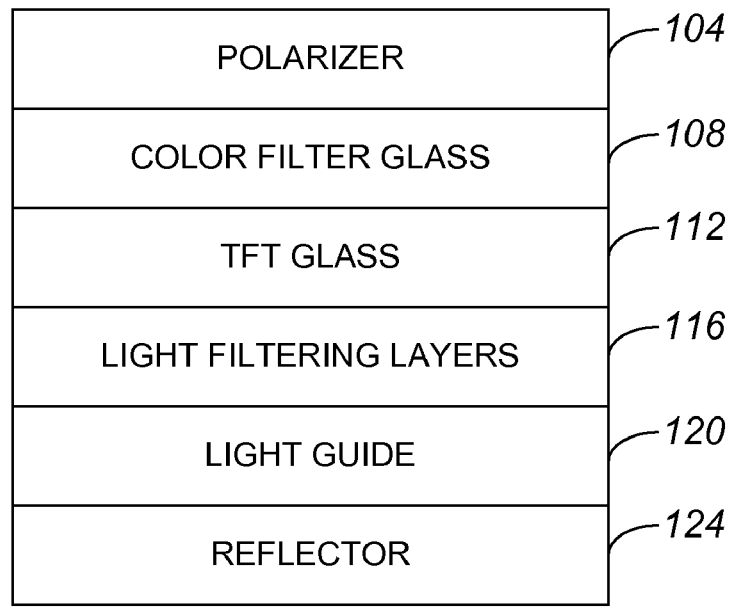
FIG. 1 is a block diagram representation of layers in a display stack.

Example embodiments of the present invention are discussed below with reference to the various figures. However, those skilled in the art will readily appreciate that the detailed description given herein with respect to these figures is for explanatory purposes, as the invention extends beyond these embodiments.

In one embodiment, a display stack suitable for use as part of an electronic device may be aligned with respect to a housing or an enclosure of the device using a chassis arrangement which is configured to remain at least partially in contact with the housing and the enclosure after the display stack is aligned. A chassis arrangement may include a portion that is designed to become a part of an overall assembly that includes the display stack and the housing. The part of the chassis arrangement that becomes part of the overall assembly may be separated from the remainder of the chassis arrangement after an alignment process is completed.

By way of example, the chassis arrangement capable of aligning a display stack with respect to a housing may include a first portion and a second portion. Such a chassis arrangement may be configured to enable the first portion to support the display stack during an alignment process, and a second portion that is effectively manipulated to enable the display stack to be relatively accurately positioned with respect to the housing. The second portion may be arranged to be detached from the first portion once the display stack is aligned with respect to the housing.

A chassis arrangement that includes a chassis portion, i.e., a portion which may grasp a display stack, and a breakaway portion, i.e., a portion which may facilitate aligning the display stack when attached to the chassis portion, which are coupled by a living hinge may be formed from substantially any suitable material which may grasp the display stack substantially without damaging the display stack. For example, the chassis arrangement may be made from a material such as plastic. Suitable materials from which the chassis arrangement may be made include, but are not limited to including, acrylonitrile-butadiene styrene (ABS), polypropylene (PP), polyamide (PA), polymethylmethacrylate (PMMA), polycarbonate (PC), a PC/ABS blend, polyetheretherketone (PEEK), silicone, and thermoplastic polyurethane (TPU). As will be appreciated by those skilled in the art, many materials may be filled to increase the stiffness associated with the materials.

A display stack may effectively be protected during an alignment procedure when held within a chassis arrangement or, more specifically, by a chassis portion of the chassis arrangement. Handling the display stack by handling the chassis arrangement protects the display stack from being damaged by allowing a handler to move or otherwise manipulate the display stack without directly touching the display stack. Further, when the display arrangement is made from a material such as plastic, edges of the display stack are substantially protected from being scratched and nicked by the chassis arrangement.

A display stack which is aligned in a housing using a chassis arrangement may generally include any number of layers. FIG. 1 is a block diagram representation of primary layers in an example display stack. A display stack 100 includes a polarizer layer 104 which overlays a color filter glass layer 108. A thin film transistor (TFT) glass layer 112 is located beneath color filter glass layer 108. Light filtering layers 116, a light guide layer 120, and a reflector layer 124 may underlie the TFT glass layer. Typically, light filtering layers 116, light guide layer 120, and reflector layer 124 provide backlighting capabilities.

Figure 2:
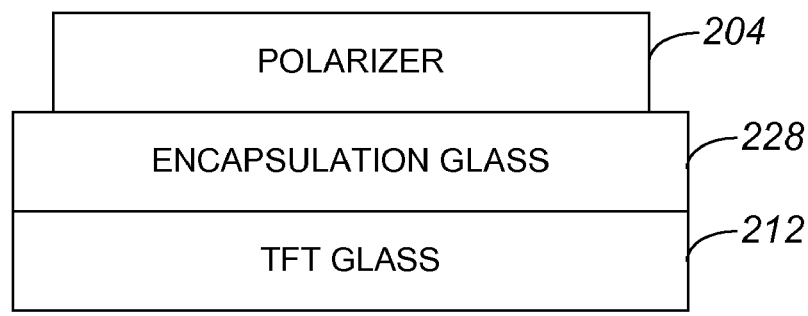
FIG. 2 is a block diagram representation of layers in an O-LED display stack.

The number of primary layers in a display stack may vary. For example, an organic light emitting diode (O-LED) display stack may include three primary layers, as an O-LED display stack does not utilize layers which provide backlighting. FIG. 2 is a block diagram representation of primary layers in an O-LED display stack. An O-LED display stack 200 includes a TFT glass layer 212, an encapsulation glass layer 228, and a polarizer layer 204. In other words, O-LED display stack 200 includes glass layers 212, 228 and an overlying polarizer layer 204.

Figure 3:
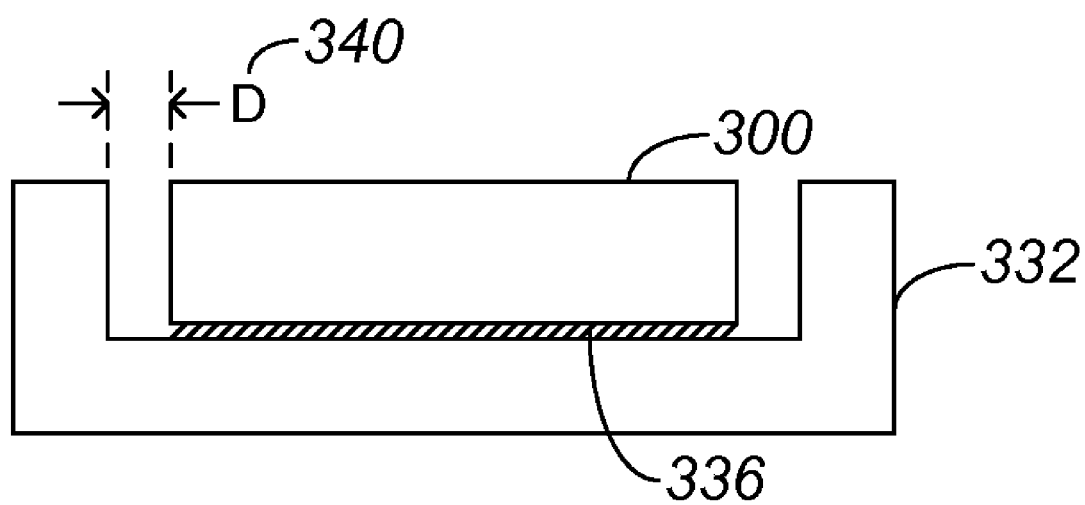
FIG. 3 is a diagrammatic cross-sectional side-view representation of a display stack positioned in an enclosure such that there is a gap between edges of the display stack and edges of the enclosure.

When a display stack is part of a device, e.g., a cellular phone device or a portable media player, the display stack may be positioned substantially within a housing or an enclosure including, but not limited to including, a pan, a bezel, and a pan that includes a bezel. The display stack may be aligned within a housing or an enclosure at a distance from the edges of the housing or the enclosure, e.g., there may be a gap between an edge of the display stack and the edge of a housing or an enclosure. FIG. 3 is a diagrammatic cross-sectional side-view representation of a display stack positioned in an enclosure such that there is a gap between edges of the display stack and edges of the enclosure. A display stack 300 is aligned within an enclosure 332, which may be a pan and/or a bezel. A bottom surface of display stack 300 may be substantially bonded to a surface of enclosure 332 using an adhesive. As shown, side surfaces of display stack 300 are separated from sides of enclosure 332 by a distance D 340. Distance D 340 may vary depending upon the requirements of a particular apparatus, i.e., the apparatus of which enclosure 332 and display stack 300 are to be a part. In one embodiment, distance D 340 may be in the range of approximately 0.2 millimeters (mil) to approximately 0.75 mil, as for example approximately 0.4 mil. Generally, distance D 340 may vary depending upon particular requirements, e.g., assembly tolerances.

A chassis (not shown) which is used to align display stack 300 with respect to enclosure 332 may be arranged to substantially fit in the gap with a width D 340. Portions of the chassis (not shown) may remain positioned in the gap after display stack 300 is suitably aligned. Such a chassis (not shown), e.g., a plastic chassis (P-chassis), may be arranged to effectively be disassembled after display stack 300 is aligned with respect to enclosure 332 such that substantially only parts of the chassis which are directly in contact with display stack 300 remain in enclosure 332.

Figure 4:
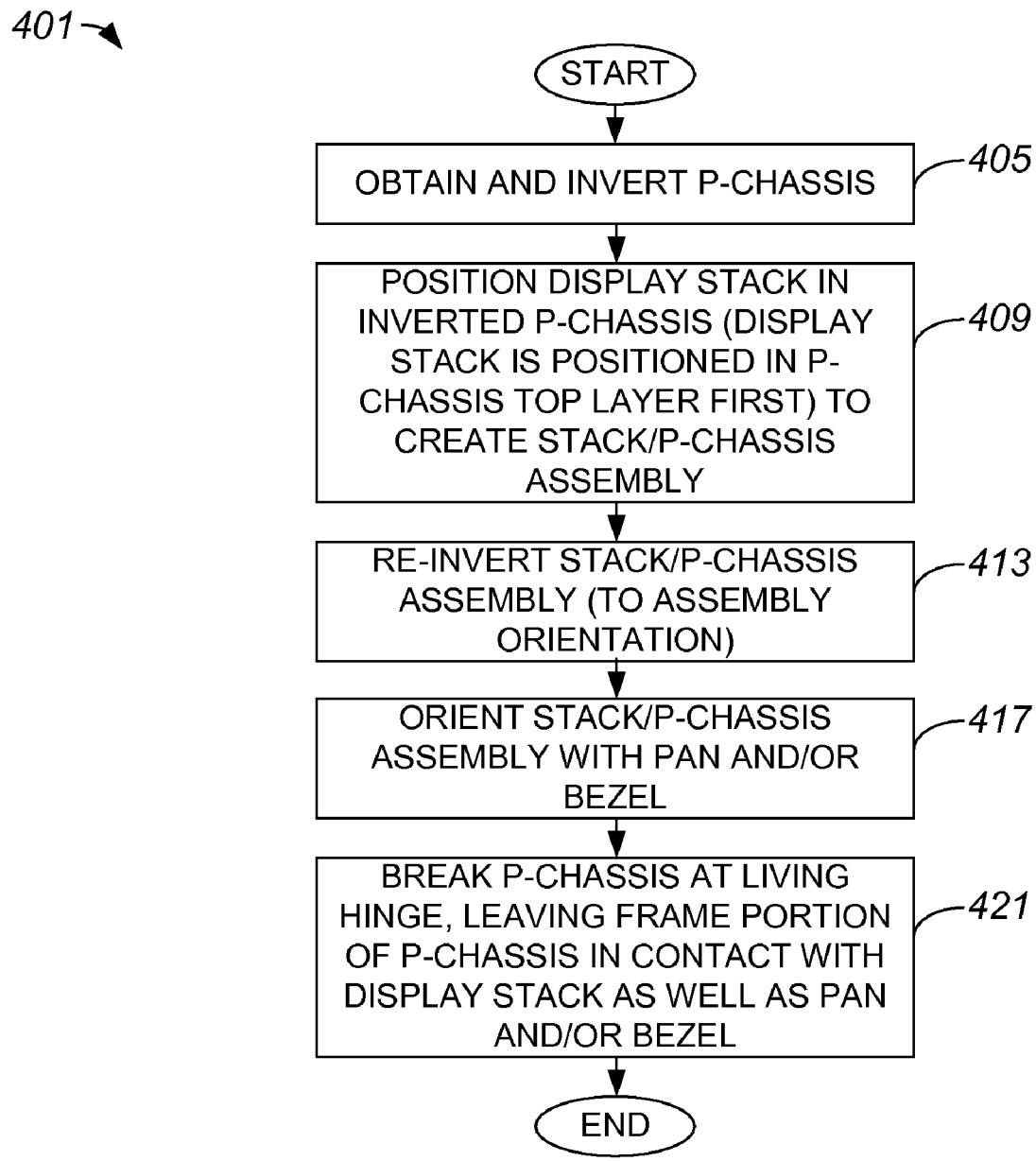
FIG. 4 is a process flow diagram which illustrates a method of using a P-chassis to position a display stack with respect to edges of a bezel in accordance with an embodiment of the present invention.

FIG. 4 is a process flow diagram which illustrates a method of using a P-chassis to position a display stack in a pan or within a bezel in accordance with an embodiment of the present invention. A process 401 of positioning a display stack with respect to a pan and/or a bezel begins at step 405 in which a P-chassis is obtained and inverted. Inverting a P-chassis generally includes orienting the P-chassis such that a chassis portion for the P-chassis faces upwards, or is otherwise positioned to receive a display stack. In the described embodiment, the P-chassis includes a living hinge that substantially separates the chassis or frame portion of a P-chassis from a detachable portion of the P-chassis. A living hinge, as will be appreciated by those skilled in the art, is a relatively thin, flexible hinge that joins relatively rigid parts. In one embodiment, P-chassis may include a rigid plastic chassis portion and a relatively rigid plastic detachable portion that are joined by a living hinge formed from relatively thin plastic. That is, the living hinge may be formed from a thinned plastic.

After the P-chassis is obtained and inverted, a display stack is positioned in the inverted P-chassis in step 409 to create a stack/P-chassis assembly. The display stack is typically positioned top-side down, e.g., the top layer is positioned in the P-chassis first, within the P-chassis. Once the display stack is positioned, or otherwise supported, within the P-chassis, the stack/P-chassis assembly is effectively re-inverted in step 413. That is, the stack/P-chassis assembly may be turned or flipped such that the display stack is ready to be coupled or otherwise oriented in a pan and/or a bezel.

In step 417, the stack/P-chassis assembly is oriented with respect to a pan and/or a bezel. Orienting the stack/P-chassis assembly with respect to the pan and/or the bezel may include, but is not limited to including, determining an exact position at which to align the display stack within the pan and/or the bezel, and applying an adhesive material to enable the display stack to effectively adhere to the pan and/or the bezel. Such an adhesive material may also secure a portion of the P-chassis, e.g., a chassis or frame portion of the P-chassis, to the pan and/or the bezel.

Once the stack/P-chassis assembly is oriented with respect to the pan and/or the bezel, e.g., a pan associated with a portable electronic device, the P-chassis is broken apart at a living hinge in step 421. Breaking, or otherwise severing, the P-chassis at the living hinge allows a chassis or frame portion of the P-chassis to remain in the pan and/or the bezel, while the detachable portion of the P-chassis is removed. As will be appreciated by those skilled in the art, the display stack also remains in the pan and/or the bezel. After the p-chassis is broken at the living hinge, the process of positioning a display stack with respect to a pan and/or a bezel is completed.

Figure 5A:
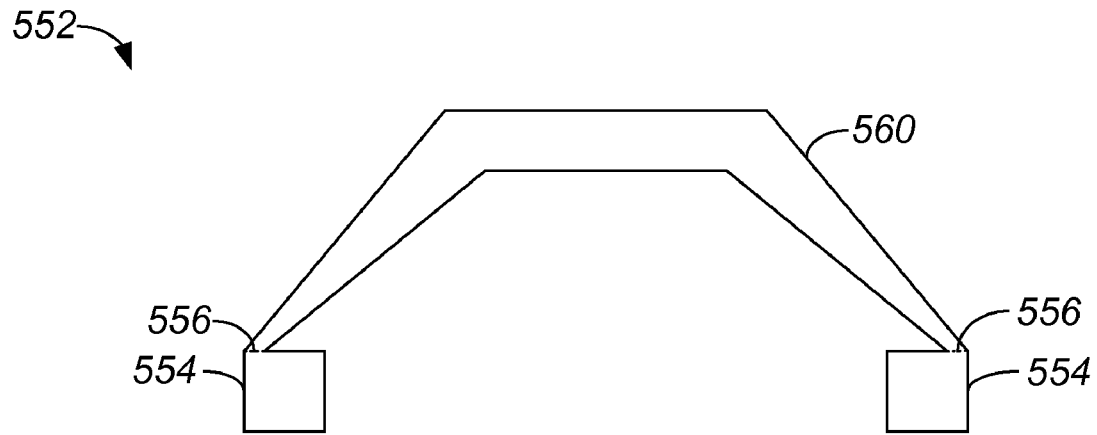
FIG. 5A is a diagrammatic cross-sectional side-view representation of a P-chassis which is suitable for use in aligning a display stack with respect to edges of a bezel in accordance with an embodiment of the present invention.

Referring next to FIG. 5A, a P-chassis which is suitable for use in aligning a display stack with respect to edges of a bezel while protecting the display stack will be described in accordance with an embodiment of the present invention. A P-chassis 552 includes a breakaway portion 560 and chassis portions 554 which are substantially connected at living hinges 556. In general, it should be appreciated that the size and the shape of P-chassis 552 may vary widely.

Figure 5B:
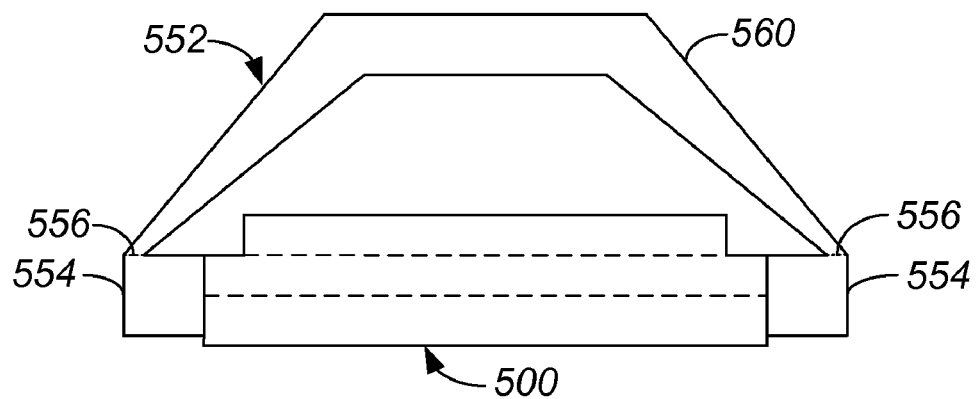
FIG. 5B is a diagrammatic cross-sectional side-view representation of a P-chassis, e.g., P-chassis 552 of FIG. 5A, holding a display stack in accordance with an embodiment of the present invention.
Figure 5C:
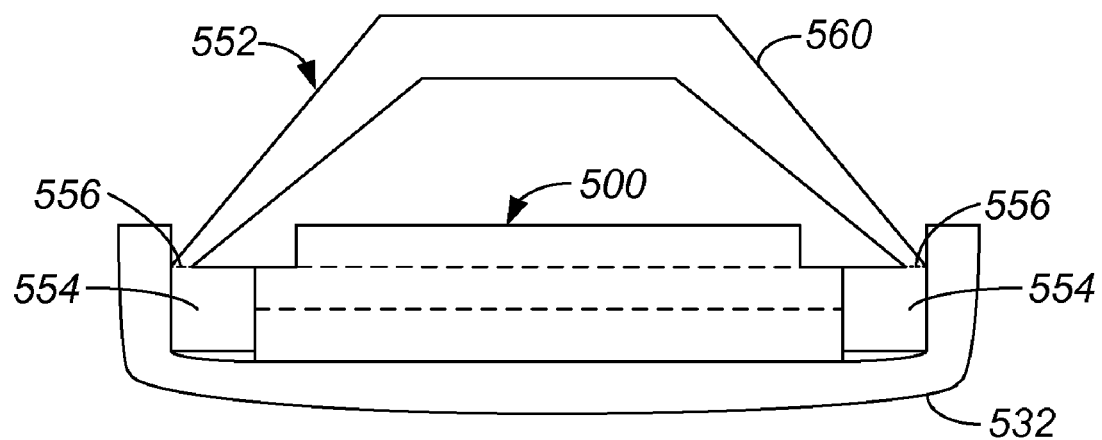
FIG. 5C is a diagrammatic cross-sectional side-view representation of a P-chassis holding a display stack, e.g., P-chassis 552 holding display stack 500 of FIG. 5B, and aligning the display stack with respect to a housing that includes a bezel in accordance with an embodiment of the present invention.

Chassis portions 554 are arranged to engage a display stack (not shown) and to remain substantially engaged to the display stack when the display stack is positioned within a pan and/or a bezel (not shown), e.g., within a housing or enclosure (not shown). FIG. 5B is a cross-sectional side-view representation of P-chassis 552 after a display stack is substantially grasped by chassis portion 554 in accordance with an embodiment of the present invention. A display stack 500 is provided within P-chassis 552 or, more specifically, such that display stack 500 is held within chassis portions 554. Once display stack 500 is held within chassis portions 554, P-chassis 552 may be aligned with respect to a housing 532, as shown in FIG. 5C. Aligning P-chassis 552 with housing 532 may include positioning display stack 500 at a desired location in pan 532 such that chassis portions 554 effectively contact a part of housing 532 while maintaining contact with display stack 500.

In one embodiment, an adhesive may be used to substantially secure chassis portions 554 to housing 532. Housing 532, which may typically include a bezel, may be formed from any suitable material including, but not limited to including, sheet metal.

Figure 5D:
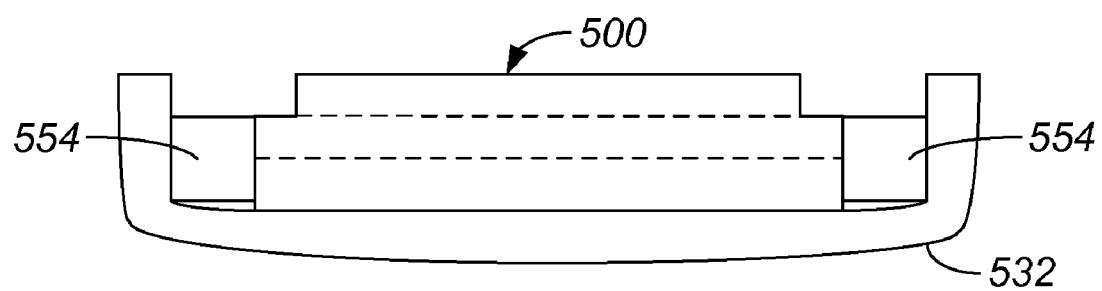
FIG. 5D is a diagrammatic cross-sectional side-view representation of a display stack positioned with respect to a housing, e.g., display stack 500 and housing 532 of FIG. 5C, after part of a P-chassis, e.g., part of P-chassis 560 of FIG. 5C, has been broken away in accordance with an embodiment of the present invention.

After display stack 500 is aligned with respect to housing 532, breakaway portion 560 may be broken away from, or otherwise uncoupled from, chassis portions 554. By way of example, breakaway portion 560 may be broken away from chassis portions 554 by breaking P-chassis 552 at living hinges 556. FIG. 5D is a cross-sectional side-view representation of display stack 500 and housing 532 after breakaway portion 560 has been broken away from chassis portions 554 in accordance with an embodiment of the present invention.

Display stack 500 is positioned within housing 532 such that chassis portions 554 effectively fills in at least part of the spaces between sides of display stack 500 and sides of housing 532.

Figure 6A:
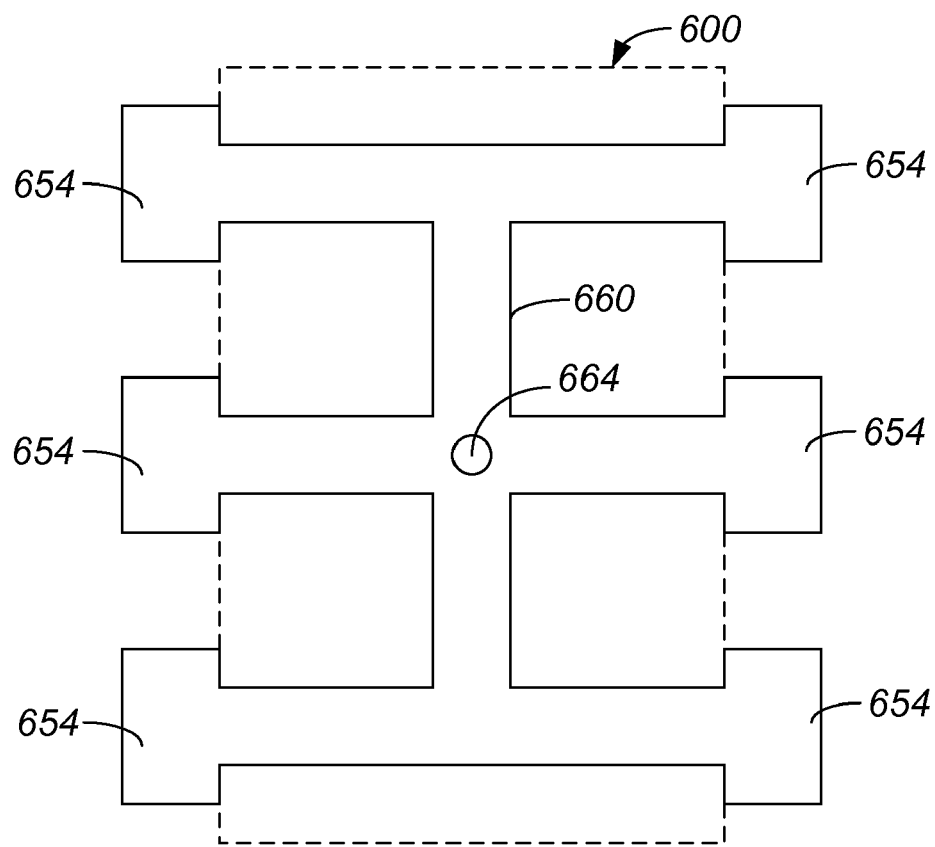
FIG. 6A is a diagrammatic top-view representation of a P-chassis holding a display stack in accordance with an embodiment of the present invention.
Figure 6B:
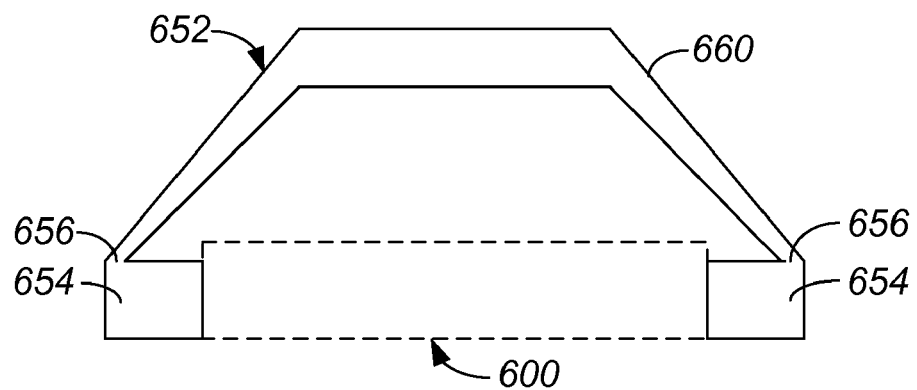
FIG. 6B is a diagrammatic side-view representation of a P-chassis holding a display stack, e.g., P-chassis 652 and display stack 600 of FIG. 6A, in accordance with an embodiment of the present invention.

As mentioned above, the size and the shape of a P-chassis may vary widely. Referring next to FIGS. 6A and 6B, one representation of a P-chassis holding a display stack will be described in accordance with an embodiment of the present invention. FIG. 6A is a diagrammatic top-view representation of a P-chassis 660 which holds a display stack 600, while FIG. 6B is a diagrammatic side-view representation of P-chassis 652 holding display stack 600. P-chassis 652 includes a plurality of chassis portions 654 which effectively cooperate to hold display stack 600. P-chassis 652 has a breakaway portion 660 that is substantially coupled to chassis portions 654 at living hinges 656. An opening 664 defined within breakaway portion 660 is arranged to enable a gate for a tool to be coupled to P-chassis 652. Opening 664 is located in approximately a center of breakaway portion 660. A gate for a tool is generally a location where molten plastic is injected into a tool. Such a gate location may be relatively large and leaves a gate vesstige e.g., opening 664, when removed from the tool.

Figure 7:
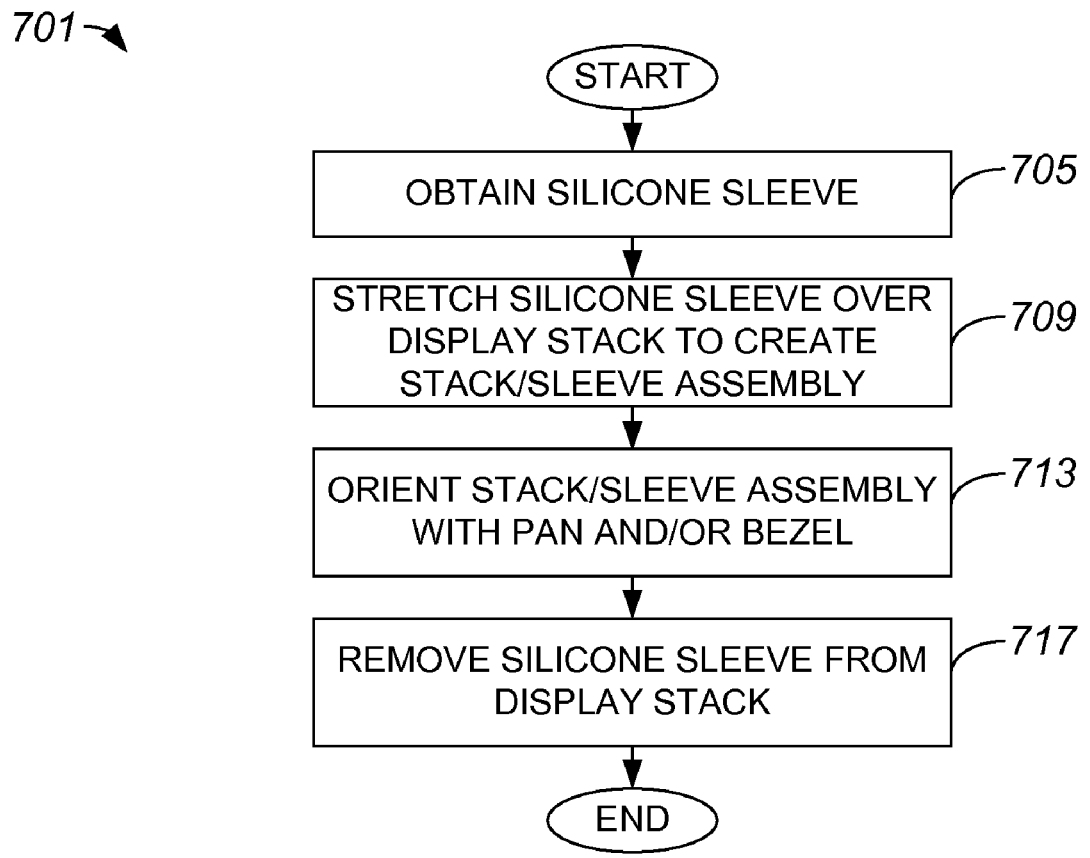
FIG. 7 is a process flow diagram which illustrates a method of using a silicone sleeve to position a display stack with respect to edges of a bezel in accordance with an embodiment of the present invention.

In addition to facilitating the alignment of a display stack, a P-chassis also protects the display stack during an alignment process. For example, the P-chassis may protect the side edges of the display stack from being damaged during an alignment process. It should be appreciated that other arrangements may protect a display stack during an alignment process. In one embodiment, a silicone sleeve or similar arrangement may be used to protect a display stack during an alignment process. Such a silicone sleeve may be stretched at least partially over a display stack to protect the display stack while the display stack is being aligned in a pan and/or a bezel. FIG. 7 is a process flow diagram which illustrates a method of using a silicone sleeve to position a display stack with respect to edges of a pan and/or a bezel in accordance with an embodiment of the present invention. A process 701 of utilizing a silicone sleeve to position a display stack begins at step 706 in which a silicone sleeve is obtained. Once the silicone sleeve is obtained, the silicone sleeve is stretched over a display stack to create a stack/sleeve assembly in step 709.

The stack/sleeve assembly is oriented or otherwise aligned with a pan and/or a bezel in step 713. In general, orienting the stack/sleeve assembly may involve using any suitable apparatus and/or method generally used to align a display stack with respect to a housing or an enclosure. Such an apparatus and/or method may involve grasping the silicone sleeve to align the display stack in lieu of grasping the display stack substantially directly. Orienting the stack/sleeve assembly with a pan and/or a bezel using a silicone sleeve may involve using a material such as adhesive to substantially secure the display stack to the pan and/or the bezel.

After the stack/sleeve assembly is oriented with the pan and/or the bezel, the silicone sleeve may be removed in step 717. Removing the silicone sleeve typically includes leaving the display stack within the pan and/or the bezel. Once the silicone sleeve is removed, the process of using a silicone sleeve to protect a display stack is completed.

Although only a few embodiments of the present invention have been described, it should be understood that the present invention may be embodied in many other specific forms without departing from the spirit or the scope of the present invention. By way of example, a P-chassis has generally been described as including substantially discrete chassis portions that effectively cooperate to hold a display stack such that the display stack may be aligned within a housing. That is, a P-chassis may include two or more discrete chassis portions that hold a display stack. However, in lieu of having a plurality of chassis portions, a P-chassis may instead have a single chassis portion that is substantially continuous, and effectively arranged to contact a significant portion of a perimeter of a display stack. For instance, a chassis portion may be such that it surrounds approximately all of the edges of a display stack.

Chassis portions may be arranged to include pins, embosses, snaps or other features which enable the chassis portions to be securely held by a housing or an enclosure, By way of example, chassis portions may include pins which are arranged to be inserted through openings in a housing.

The height and the width associated with a chassis portion of a P-chassis may vary depending upon a variety of different factors. In one embodiment, the dimensions associated with the chassis portion may vary depending upon the height of a display stack. For example, for an O-LED display stack, if two glass layers are each approximately 0.15 mil in height and the polarizing layer is approximately 0.1 mil in height, the chassis portions of a P-chassis may be approximately 0.4 mil in height. The width of a chassis portion may be approximately the same as the width of a gap between the edges of a display stack and the sides of a housing. For example, if the width of the gap is approximately 0.4 mil, the chassis portion may have a width of approximately 0.4 mil, and if the width of the gap is approximately 0.2 mil, the chassis portion may have a width of approximately 0.2 mil.

In general, a display stack may include any number of primary layers. As discussed above, a display stack may include a plurality of primary layers. It should be appreciated however, that a display stack is not limited to including a plurality of primary layers and may, instead, include a substantially single layer.

A variety of different methods may be used to form a P-chassis. Such methods include, but are not limited to including, an injection molding process which allows the P-chassis to be formed as a substantially single part.

The operations associated with the various methods of the present invention may vary widely. By way of example, steps may be added, removed, altered, combined, and reordered without departing from the spirit or the scope of the present invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for aligning a display stack with respect to an enclosure, the method comprising:
   positioning the display stack in a chassis arrangement, the chassis arrangement including a first portion arranged to grasp the display stack and a second portion arranged to manipulate the display stack when the display stack is grasped by the first portion, wherein the first portion and the second portion are coupled;
   orienting the display stack at least partially within the enclosure, wherein orienting the display stack at least partially within the enclosure includes positioning the display stack at a desired location within the enclosure; and
   detaching the second portion from the first portion, wherein the first portion to remains in contact with the display stack after the second portion is detached from the first portion.

2. The method of claim 1 wherein positioning the display stack in the chassis arrangement includes inverting the display stack to position the display stack in the chassis arrangement, and wherein orienting the display stack at least partially within the enclosure includes re-inverting the display stack to orient the display stack with respect to the enclosure.

3. The method of claim 1 wherein positioning the display stack at the desired location within the enclosure includes positioning the display stack such that a first edge of the display stack is located at a first distance from a first side of the enclosure.

4. The method of claim 3 wherein the first portion is positioned between the first edge and the first side.

5. The method of claim 1 further including:
   bonding the display stack to the enclosure.

6. The method of claim 5 wherein bonding the display stack to the enclosure includes applying an adhesive to secure the display stack to the enclosure.

7. The method of claim 1 further including:
   coupling the first portion to the enclosure.

8. The method of claim 7 wherein coupling the first portion to the enclosure includes applying an adhesive to secure the first portion to the enclosure.

9. The method of claim 7 wherein the first portion includes at least one attachment feature, wherein coupling the first portion to the enclosure includes attaching the at least one attachment feature to the enclosure.

10. The method of claim 1 wherein the first portion and the second portion are coupled through at least one living hinge, and wherein detaching the second portion from the first portion includes breaking the at least one living hinge.

* * * * *